United States Patent [19]

Hergenrother et al.

[11] Patent Number: 4,708,987

[45] Date of Patent: Nov. 24, 1987

[54] RAPID BULK POLYMERIZATION OF POLYBUTADIENE/NYLON AND RELATED BLOCK COPOLYMERS

[75] Inventors: William L. Hergenrother, Akron; Arthur W. Greenstreet, Clinton, both of Ohio

[73] Assignee: The Firestone Tire & Rubber Company, Akron, Ohio

[21] Appl. No.: 834,603

[22] Filed: Feb. 28, 1986

Related U.S. Application Data

[63] Continuation-in-part of Ser. No. 595,003, Mar. 29, 1984, abandoned.

[51] Int. Cl.$^4$ .......................... C08F 8/30; C08L 47/00
[52] U.S. Cl. ...................................... 525/184; 525/91; 525/123; 525/130; 525/355; 525/358; 525/366
[58] Field of Search ................. 525/123, 130, 184, 91, 525/355, 358, 366

[56] References Cited

U.S. PATENT DOCUMENTS 3,838,108  9/1974  Hergenrother et al. ............ 260/77.5
4,070,344  1/1978  Hergenrother et al. ............ 260/77.5

FOREIGN PATENT DOCUMENTS

WO83/03421  10/1983  PCT Int'l Appl. ................... 525/91

Primary Examiner—Lewis T. Jacobs
Assistant Examiner—A. Carrillo
Attorney, Agent, or Firm—Frank J. Troy, Sr.

[57] ABSTRACT

A process for the rapid bulk polymerization of polybutadiene/nylon-6 block copolymers comprises the steps of preparing a mixture comprising from about 100 to about 50 parts by weight of a low molecular weight polybutadiene terminated by an isocyanate or isothiocyanate and end-capped with caprolactam providing a stable imide type terminated polymer, with from about 0 to about 50 parts by weight of a dry non-cold flowing rubber neutralized with caprolactam, charging the polymer mixture without hydrolyzing the end-capped polybutadiene to a reaction vessel with caprolactam and polymerizing the caprolactam at a temperature sufficient to flash off any solvents introduced during the step of preparing to form a block copolymer with the end-capped polybutadiene. The process of the present invention is also applicable to the rapid polymerization of other block copolymers formed from anionically polymerized cold flowing rubbers terminated by a compound selected from the group consisting of isocyanates and isothiocyanates and end-capped with an amide containing compound providing a stable imide type terminated rubber and mixed with a non-cold flowing rubber terminated with an amide containing compound which mixture is then charged to a reaction vessel without hydrolyzation with a monomer having an active hydrogen other than a monomer utilized to form a polymer present in the polymer mixture and polymerizing the monomer at a temperature sufficient to flash off any solvents introduced during the step of preparing.

21 Claims, No Drawings

RAPID BULK POLYMERIZATION OF POLYBUTADIENE/NYLON AND RELATED BLOCK COPOLYMERS

CROSS-REFERENCE TO RELATED APPLICATIONS

This application is a continuation-in-part of U.S. Ser. No. 595,003, filed Mar. 29, 1984, now abanoned.

TECHNICAL FIELD

The present invention is directed toward a process for the rapid polymerization of certain block copolymers. Most typical of such polymers are the copolymers of conjugated dienes and nylon which have been demonstrated to have useful properties as thermosets. The polymers have been described exclusively in several U.S. patents, as will be discussed hereinbelow in greater detail. The early polymers exhibited cold flow and subsequent work has provided novel processes for the elimination thereof. This invention is a further step in the field whereby the polymers, which have use as thermosets and are non-cold flowing, can now be produced more rapidly as compared to the previous processes.

BACKGROUND ART

Copolymers of the type produced by the process of the present invention were first described in U.S. Pat. No. 3,838,108, owned by the Assignee of record herein. That patent taught the anionic polymerization of olefins and other monomers which were then end-capped with isocyanates or isothiocyanates. Typically, the olefin selected was butadiene and once end-capped, it was then reacted with other monomers, namely nylon forming or lactams containing at least three carbon atoms in the lactam ring. The resulting nylon block copolymers retained the favorable characteristics of the nylon such as good impact strength, good abrasion resistance and low coefficients of friction. Unexpectedly and additionally, they possessed the processing characteristics of the base polymer which in the case of the polybutadienes, meant milling and processing at ambient temperatures. Furthermore, they could be molded as plastics or as rubbers and at temperatures below the melt temperature of the nylon.

The only attendant problem possessed by these copolymers was that they exhibited cold flow. A substance is said to cold flow if a quantity of it will gradually flow or spread itself out over a flat surface even though it is normally a solid and will retain a given shape for a short period of time.

In U.S. Pat. No. 4,070,344, also owned by the Assignee of record, a similar procedure was initially followed through the end-capping step of the polybutadiene or other base polymer with a polyisocyanate or polyisothiocyanate. This polymer was then reacted with compounds containing an amide, such as a lactam, to give an imide type end group, which was subsequently hydrolyzed to form a stable amine terminated polymer which could itself be used or stored for an extended time and then reacted with other monomers to provide various block and graft copolymers. Exemplary monomers include amides, ureas, urethanes, imides and the like. These materials possessed useful polymer properties but also exhibited cold flow.

In a co-pending application, owned by the Assignee of record, a solution polymerization was set forth for the preparation of free flowing pellets of cold flowing rubber. The process included the steps of preparing in suspension the tacky, cold flowing polymer in the presence of a solution of non-cold flowing rubber to form a product, removing the suspension solvent, pelletizing and then subjecting the pellets to a surface treatment to remove tack.

With the exception of the co-pending application, it has not been possible heretofore to eliminate cold flow and tack from cold flowing rubber and copolymers. However, the latter process does not provide for the rapid bulk polymerization of the component monomers. In addition to the speed of the present process, there is also no necessity of solvent removal.

DISCLOSURE OF THE INVENTION

The process of the present invention provides for the rapid bulk polymerization of polybutadiene/nylon-6 block copolymers and comprises the steps of preparing a mixture comprising from about 100 to about 50 parts by weight of a polybutadiene having a weight average molecular weight of about 3000 and terminated by a compound selected from the group consisting of isocyanates and isothiocyanates and end-capped with caprolactam providing a stable imide type terminated polymer, with from about 0 to about 50 parts by weight of a branched high vinyl, 1,2-polybutadiene having a weight average molecular weight greater than 100,000 and neutralized with caprolactam; charging the polymer mixture, without hydrolyzing said end-capped polybutadiene, to a reaction vessel with caprolactam; and polymerizing the caprolactam at a temperature of at least about 120° C., said temperature being sufficient to flash off any solvents introduced during the step of preparing, and for a time of up to about 30 minutes whereby polymerization proceeds in the absence of solvents to form a block copolymer with the end-capped polybutadiene.

The process of the present invention is more broadly applicable to the rapid bulk polymerization of other block copolymers. It comprises the steps of preparing a mixture comprising from about 100 to 50 parts by weight of a stable, anionically polymerized cold flowing rubber endcapped by a compound selected from the group consisting of isocyanates and isothiocyanates and terminated with an amide containing compound providing a stable imide type terminated rubber and from about 0 to 50 parts by weight of a non-cold flowing dry rubber neutralized with an amide containing compound; charging the polymer mixture without hydrolyzing the end-capped rubber to a reaction vessel with a monomer having an active hydrogen other than a monomer utilized to form a polymer present in the polymer mixture and polymerizing the monomer at a temperature sufficient to flash off any solvents introduced during the step of preparing and for a time of up to about 30 minutes whereby polymerization proceeds in the absence of solvents to form a block copolymer with the end-capped polymer.

PREFERRED MODE FOR CARRYING OUT THE INVENTION

In its most preferred form, the present invention provides a process for the rapid bulk polymerization of caprolactam onto a terminally modified polybutadiene, thus producing a Maran resin. Polymerization time has been reduced from about 120 to 180 minutes for a solution polymerization process conducted at 160° C., to about five to thirty minutes at 180° to 185° C. by employing the bulk polymerization process of this invention. The products obtained are equivalent in cure properties but the present process requires no subsequent drying to remove the solvent.

The use of a non-cold flowing rubber, such as high molecular weight high vinyl polybutadiene, formerly as a post reaction additive or as a solution polymerization additive, to eliminate cold flow is also incorporated into the present process.

The first step of the process calls for mixing of an anionically polymerizable cold flowing rubber or base polymer, terminated by an isocyanate and end-capped with dry caprolactam, with a non-cold flowing dry rubber, neutralized with dry caprolactam. Preferred ratios by weight are 2:1, respectively, although from about 100 to about 50 parts of the cold flowing rubber can be mixed with about 0 to 50 parts of the non-cold flowing rubber.

Typical of the cold flowing rubber or base polymer is the low molecular weight 1,2-polybutadiene which is first terminated with an isocyanate or an isothiocyanate as described in the aforementioned U.S. Pat. No. 3,838,108, the subject matter of which is hereby incorporated by reference particularly for its disclosure of other base polymers, any of which can be utilized herein.

As is there disclosed, the monomers which can be utilized include a wide variety of materials such as dienes and vinyl substituted aromatics, e.g., 1,3-butadiene and styrene, respectively. Generally, any monomer capable of undergoing anionic polymerization can be used. Some of these monomers can be generally classified as olefins since they contain at least one olefinic group and may be represented by the following structural formulae, wherein R is hydrogen, alkyl, cycloalkyl, an aromatic ring or a substituted aromatic ring:

(1) $CH_2=CACN$ wherein A is CN, $CF_3$, $CH_3$ or H
(2) $CH_2=CACO_2R$ wherein A is $CO_2R$, $SO_2R$, $CH_3$ or H
(3) $CH_2=CANO_2$ wherein A is Cl, $CH_3$ or H
(4) $CH_2=CACON(R)_2$ wherein A is $CH_3$ or H.

Other monomers which can be anionically polymerized are represented by the following structural formulae:

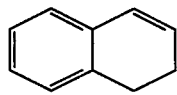 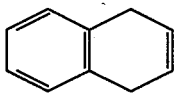 (5)

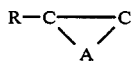 (6)

where A is O or S and R is H or an aliphatic, cycloaliphatic or aromatic group containing from 1 to 15 carbon atoms, inclusive.

(7) RCH=A where A is O or S and R is an aliphatic, cycloaliphatic or aromatic group containing from 1 to 15 carbon atoms, inclusive.

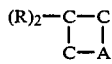 (8)

where A is O or S and R is an aliphatic, cycloaliphatic or aromatic group containing from 1 to 15 carbon atoms, inclusive.

(9) $(R)_2C=S$ where R is an aliphatic, cycloaliphatic or aromatic group containing from 1 to 15 carbon atoms, inclusive.

The monomers as represented by formulae 6, 7, 8 and 9 are preferred in the subject invention. Examples of such monomers include ethylene oxide, propylene oxide, styrene oxide, ethylene sulfide, propylene sulfide, styrene sulfide, acetaldehyde, propionaldehyde, isobutyraldehyde, n-caproaldehyde, acetthioaldehyde, propionthioaldehyde, isobutyrthioaldehyde, n-caprothioaldehyde, 3-dimethyloxycyclobutane, 3-diethyloxycyclobutane, 3-methyethyloxycyclobutane, 3-dimethylthiocyclobutane, 3-diethylthiocyclobutane, 3-methylethylthiocyclobutane, methyl ethyl thioketone, methyl isopropyl thioketone and diethyl thioketone. Suitable monomers represented by formula No. 9 do not include large groups such as two phenyls since such monomers are difficult to polymerize due most probably to steric hindrance.

Other preferred monomers which may generally be used to prepare the isocyanate terminated polymers employed in this invention are the conjugated dienes and the vinyl substituted aromatic compounds. The conjugated dienes ordinarily contain from 4 to 12 carbon atoms and preferably from 4 to 8 carbon atoms. Examples of such dienes include 1,3-butadiene; isoprene; 2,3-dimethyl-1,3-butadiene; 2-methyl-1,3-pentadiene; 3,4-dimethyl-1,3-hexadiene; 4,5-diethyl-1,3-octadiene; 3-butyl-1,3-octadiene; phenyl-1,3-butadiene and the like. The vinyl substituted aromatic compounds include styrene, 1-vinylnaphthalene, 2-vinylnaphthalene, and the alkyl, cycloalkyl, aryl, alkaryl and arakyl derivatives thereof in which the total number of carbon atoms in the combined substituents is generally not greater than 12. Examples of such compounds include 3-methylstyrene; alpha-methylstyrene; 4-n-propylstyrene; 4-t-butylstyrene; 4-dodecylstyrene, 4-cyclohexylstyrene; 2-ethyl-4-benzylstyrene; E4-methoxystyrene; 4-dimethylaminostyrene; 3,5-diphenoxystyrene; 4-p-tolystyrene; 4-phenylstyrene; 4,5-dimethyl-1-vinylnaphthalene; 3-n-propyl-2-vinylnaphthalene and the like.

The conjugated dienes and the vinyl substituted aromatic compounds as well as many of the other monomers noted herein generally can be polymerized alone or in admixture to form homopolymers, copolymers or block copolymers which serve as the base polymer. The dienes which are preferred are 1,3-butadiene and isoprene, and preferred vinyl substituted aromatic monomers are styrene, alpha-methylstyrene and 4-t-butylstyrene. A preferred base copolymer is styrene-butadiene.

Yet another group of monomers which can be employed are the heterocyclic nitrogen containing monomers such as pyridine and quinoline derivatives containing at least 1 vinyl or alphamethylvinyl group such as 2-vinyl-pyridine, 3-vinylpyridine, 4-vinylpyridine, 3-ethyl-5-vinylpyridine, 3-methyl-5-vinylpyridine, 3,5-diethyl-4-vinylpyridine and similar mono- and di-substituted alkenyl pyridines and like quinolines such as 2-vinylquinoline, 3-vinylquinoline, 4-vinylquinoline and so forth. In general the various vinyl substituted pyridines and vinyl substituted quinolines are also preferred monomers.

All of the foregoing monomers are suitable for preparation of block copolymers with caprolactams and the other monomers disclosed hereinbelow and some combinations would not exhibit the property of cold flow. Inasmuch as the use of a non-cold flowing rubber is employed for the purpose of removing cold flow from the block copolymer, not to provide rapid polymerization, it will be understood that the non-cold flowing rubber is an optional component. Similarly, where cold flow would not be objectionable, the non-cold flowing rubber can be omitted. For this reason the amount of non-cold flowing rubber that can be added during the mixing step ranges between 0 (not present) to about 50 parts by weight.

The base polymer is first terminated with an isocyanate and then reacted with an amide containing compound such as dry caprolactam in the manner set forth in the aforementioned U.S. Pat. No. 4,070,344, the subject matter of which is also incorporated herein by reference. This results in the formation of a stable imide type terminated polymer. Unlike the process of that patent, however, the imide type terminated polymer is not hydrolyzed. Hydrolyzation is an extra step which must be followed with a further extra step of reacting with an activator such as toluene diisocyanate, neither of which is present in the processes claimed herein.

The non-cold flowing rubber is preferably a high molecular weight high vinyl 1,2-polybutadiene. It is a rubber, as is the linear, 1,2-polybutadiene material discussed hereinabove, but differs primarily by the fact that it is non-cold flowing, while the former is a cold flowing material. It can be prepared in conjunction with the mixture step by the anionic polymerization of 1,3-butadiene in the presence of an organolithium initiator modified with bis-heterocyclic ethane compounds such as bis-morpholino ethane (DME), bis-piperidino ethane (DPE), bis-pyrrolidino ethane (DPEE), and bis-N-methyl piperazino ethane (DNMPE). The polymer obtained by this process contains as much as 100 percent vinyl polybutadiene and randomly distributed syndio and isotactic units. In general, a bis-piperidino ethane modified n-butyllithium initiator can be readily employed. Neutralization with dry caprolactam is preferable to provide a solution that will be compatible with the anionic nylon polymerization involved in the subsequent steps of the Maran resin preparation.

Both polymers employed in the mixture are end-capped or terminated with caprolactam for compatibility with the caprolactam polymerization step which will follow to produce the Maran resin. It is to be understood that other compounds containing an amine group could be substituted for the terminal group depending upon the particular copolymer that is to be prepared. As such, the subject invention is not to be limited to caprolactam terminated polymers.

The cold flowing polymer and non-cold flowing polymer mixture can be prepared in a small quantity of nonreactive solvent and then concentrated to less than 20 percent solvent. It should be appreciated that the amount of solvent is insufficient to conduct a solvent polymerization which, as noted hereinabove, requires a much longer time. The use of a small amount is merely an expedient which facilitates complete mixing of the two polymers. Also where the mixture is formed without a non-cold flowing rubber, the use of a small amount of solvent aids the introduction of the liquid caprolactam or other monomer providing an active hydrogen during the subsequent step of charging and the subsequent copolymerization thereof.

Suitable nonreactive solvents are exemplified by a paraffin, cycloparaffin or aromatic having from four to about 10 carbon atoms, such as hexane, heptane, cyclohexene, benzene, toluene and the like, and then concentrated to less than 20 percent solvent. Inasmuch as the solvent is optional, solvent volume can be minimized to provide solutions of at least 80 percent solids and easily higher. In the work reported hereinbelow, 80 percent by weight rubber was employed for convenience in transferring the cold-flowing rubber from the reactor in which it was prepared to the reactor wherein the block copolymer was formed. Nevertheless, it is within the skill of the art to employ a system where solvent use is significantly limited if not eliminated so long as effective mixing of the component reactants can be achieved.

Effective mixing must occur between the highly viscous cold-flowing rubber, rubber mixture or less viscous solution thereof and a fluid, i.e., caprolactam or other block polymer-forming monomer. Suitable mixing apparatus can be selected from both the rubber and the plastics industries for the addition of compounding additives. For a batch process, batch compounding mixers including those having two or more sigma blade rotors, such as Brabender lab mixers can be employed as well as Banbury rubber compounders and, general purpose sigma blade mixers. For a continuous process, twin screw compounders and extruders are preferred while static mixers and simple extruders with mixing screws can also be employed. Again, the mixing step can be aided through the use of a small quantity of nonreactive solvent.

Inasmuch as twin screw compounders are known to be very effective in removing solvents from rubber, at least one production configuration would feed the 23 percent rubber solution prepared hereinbelow directly into the first zone of such apparatus from which the solvent would be stripped. During the step of charging the lactam or other monomer would be injected into the second zone wherein the polymerization would commence. Static mixtures could be added for additional residence time. A twin screw compounder is also very well suited because it provides multiple kneading zones for dispersion and several different temperature zones. The twin screw compounder utilized in the work discussed hereinbelow was a Werner-Pfleiderer, Model ZSK-30 with a 900 mm length barrel.

The charging step of the process occurs simultaneously with the step of feeding the rubber solution mixture to the reaction vessel and that is feeding the monomer to be polymerized to the rubber or base polymer. In the preferred embodiment, this is dry caprolactam in order to form a block of nylon-6. It is also preferred, but not essential, to provide an antioxidant in order to prevent gellation. Any known antioxidant in the rubber industry is suitable and amounts range from about 0.01 to about 10 weight percent based upon the dry weight of the rubbers employed.

The amount of the two feeds is somewhat dependent upon the properties desired for the resultant copolymer. In general, the rubber mixture can comprise from about 15 to about 90 parts by weight (solids) with 35 to 25 parts preferred, and the second monomer will comprise the necessary compliment to equal 100 parts.

As noted hereinabove, the temperature of the polymerization reaction is preferably between about 180° to 185° C. although a broader range is possible between about 120° and 205° C. for the lactams and possibly less for the other monomers. Polymerization time is as short as five minutes and need not exceed 30 minutes. While longer times may be employed, in the interest of effecting a rapid polymerization, 30 minutes is a practical upper limit. Being a bulk polymerization process, there is no step of solvent removal required at this stage.

After the copolymer is formed, it can be pelletized if it is intended to be fed to the hopper of an injection molding apparatus. This is readily performed by known methods in the art, one by way of example would involve extruding the copolymer as a continuous strand from the reactor extruder and chopping into pellets.

The product resulting from the process of this invention is free from cold flow but may still possess surface tack, i.e., stickiness. The process may therefore include a separate step whereby the particles or pellets are subjected to a surface treatment, namely addition to an aqueous solution which can react chemically therewith. Typical chemical reactions include oxidation, halogenation, hydroxylation and the like. Suitable treatment agents would include aqueous solutions of $Br_2$, $Cl_2$, NaOCl, KOCl, $Ca(OCl)_2$, $KMnO_4$, $K_2Cr_2O_7$, $H_2O_2$, $OsO_4$ and the like. While several of these can be employed alone, hydrochloric acid can be added to the sodium, potassium and calcium salts to speed the treatment. Where the cold flowing polymer comprises polybutadiene homopolymer or copolymer it is believed that the chemical treatment adds to the surface unsaturation imparted by the polybutadiene portion of the blend.

The step can be practiced by immersing previously formed pellets in one of the aqueous solutions set forth hereinabove and stirring for about 0.5 to about 30 minutes, depending upon the concentration employed, at a temperature of 25° C. The treated pellets are then filtered from the aqueous solution and washed with water to remove any residue solution. After sufficient washing, the pellets are then air dried. The resulting pellets are then also tack free.

An alternative surface treatment would include dusting or coating the pellets with a layer of a powdery filler material such as talc, mica, silica, polyethylene or the like. Where the presence of a filler material in the final product would not be undesirable from consideration of physical properties or appearance, the dusting step can be employed. If, on the other hand, no filler should be present, the first treatment with an aqueous solution as disclosed hereinabove should be employed.

Before proceeding to specific examples hereinbelow illustrating the preparation of a non-cold flowing Nylon/polybutadiene block copolymer, i.e., Maran, the foregoing description can be broadened to include other rubbers and monomers which can be employed according to the process of the present invention for the rapid formation of other copolymers.

First, with respect to the cold-flowing rubber, any of the rubber-producing monomers disclosed in U.S. Pat. No. 3,838,108 can be selected and initially end-capped with an isocyanate or an isothiocyanate as is described therein. Next, as to the non-cold flowing rubber, in addition to the high molecular weight high vinyl 1,2-polybutadiene discussed hereinabove, others include rubbers such as ethylene-propylene-diene terpolymer; Nordel, a registered trademark of E. I. duPont de Nemours and Co. for ethylene-propylene-hexadiene terpolymer; natural rubber; styrene-butadiene rubber; butyl rubber; Norsorex, a polynorbornene available from American Cyanamid; polypentamer; the thermoplastic elastomers of styrene and conjugated dienes such as Kraton, a styrene-butadiene-styrene block copolymer and the like. Kraton is a registered trademark of Shell Chemical Co.

It is to be noted that styrene butadiene rubber is not identical to the thermoplastic elastomers of styrene and conjugated dienes such as butadiene and should not be confused therewith. The former is a synthetic rubber commonly referred to as SBR. It is the most common type of synthetic rubber and is prepared by the random copolymerization of approximately one part styrene with three parts butadiene. These materials are thermosetting and once vulcanized, have rubbery properties. Suitable examples commercially available abound, with particularly useful materials being Stereon 700 and Stereon 720 comprising 20 percent and 10 percent styrene, respectively. These SBRs are available from Firestone Synthetic Rubber and Latex Company.

Thermoplastic elastomers or TPEs are a thermoplastic class of compounds that also have rubbery properties. What is particularly significant about them is that they possess the properties of rubber, natural or synthetic without any vulcanization. Moreover, being thermoplastic they are readily reprocessable merely by melting; an important characteristic further distinguishing them from SBR and other thermosetting rubbers. One particularly useful composition involves a block copolymer comprising polystyrene-polybutadiene-polystyrene or S-B-S polymer, one of two commercially available classes as Kraton. Unlike natural or synthetic rubber, e.g., SBR, which obtain their rubbery properties as a result of long polymer chains being joined by irreversible chemical crosslinks during vulcanization, the unique properties of the TPEs are attributed to their linear plastic-elastomer-plastic structure. This structure is so unique that an elastomer-plastic-elastomer compound comprising the same materials requires vulcanization for full development of properties.

Finally, in order to conclude the polymerization with the addition of the second block, any of the foregoing isocyanate-reactive monomers or monomer groups disclosed in U.S. Pat. No. 3,838,108 can be employed in lieu of the nylons such as the ureas, urethanes, urethane-ureas, imides, thioureas, thiourethanes and the like. These have in common the fact that each contains an active hydrogen which is reactive toward the isocyanate terminated base polymer as was amply illustrated in U.S. Pat. No. 3,838,108. Hence, for purposes of this invention, the second block forming monomer can be generally described as one having an active hydrogen but which monomer is not one utilized to form a polymer present in the polymer mixture of the first step.

In order to demonstrate practice of the present invention two block copolymers comprising low molecular weight, high vinyl polybutadiene and nylon-6 were prepared as will now be set forth. Cold flow was eliminated by the use of non-cold flowing rubber, viz., high molecular weight high vinyl 1,2-polybutadiene.

A solution comprising 1,2-polybutadiene-NCO, end-capped with dry caprolactam, $\overline{Mw}$ 3000, and 1,2-polybutadiene, $\overline{Mw}$ 125,000, prepared with DPE and neutralized with dry caprolactam was prepared by mixing two parts and one part, respectively, of 23 percent rubber solutions in hexane to provide a rubber solution which was concentrated to 79.4 percent total solids. The first or cold flowing rubber was prepared according to the process set forth in U.S. Pat. No. 4,070,344 with the exception of the step of hydrolyzation which was not employed which also obviated the need to add a reactive compound subsequently.

The non-cold flowing high molecular weight polybutadiene rubber was separately prepared by adding to a clean, dry, stirred reactor 4545 g of a 24.5% blend of butadiene in hexane. After cooling to about 4° C., 2.8 cc of 4.66 molar (0.0134 moles) of dipiperidinoethane and 4.0 cc of a 1.53 molar (0.00612 moles) solution of n-butyl lithium in hexane was charged. The reaction was stirred for 16 hours and then 8.0 cc of a 1 molar (0.008 moles) solution of dry caprolactam in toluene was added. This rubber was 23.4% solids and had a 1,2 content of 98% and an intrinsic viscosity of 1.42 dl/g as measured at 25° C. in toluene.

EXAMPLE NO. 1

This polymerization was conducted in continuous fashion in the ZSK-30 twin screw compounder by metering 10.2 g/min of the foregoing rubber mixture solution and 8.6 g/min of dry caprolactam containing 1 percent of phenyl beta naphthylamine (PBNA) as an antioxidant. The components were in the extruder for a total of five minutes. The various zones of the extruder, from throat to die face, were maintained at 190°, 184°, 194°, 182° and 186° C. The extruder was run at 25 rpm at a 13 to 15 percent torque, 100 percent torque equal to 86 Nm. These conditions were held for 50 minutes during which time the continuous strand was collected, cooled and chopped. It will be noted from the low torque of the compounder that the presence of a solvent was not necessary.

Nitrogen analysis established that the pellets had a nylon-6 content of 42.3 percent. Plasticity was 42.2 cm$^2$ and intrinsic viscosity was 0.65 at 25° C. in 1/1 phenol/tetrachloroethane. Oxidation of the pellets with Ca(OCl)$_2$/HCl gave free flowing pellets that could be compounded or cured as in Example No. 2 to give a hard, tough thermoset.

EXAMPLE NO. 2

As an example of a batch process, into a Brabender mixer, purged with nitrogen, heated to 190° C. and operating at 60 rpm was charged 35 g of the rubber mixture solution and 28 g of dry caprolactam containing 0.3 g of PBNA. No torque increase was noted during the subsequent reaction but the mixture changed from a wet semi-liquid to a dry putty like mixture between three and five minutes of mixing which indicates that the typical continuous-rubber-phase composition, which characaterizes Maran resins, was maintained. After eight minutes the mixture was removed and cooled.

A plasticity of 38 cm$^2$ was measured as in Example No. 1 by pressing 0.5 g at 2000 psi (13.8 MPa) for 30 seconds at 150° C. Water solubles were found to be 1.8 percent, typical of solution Maran prepared at longer times. This polymer was compounded with 150 parts of potter glass, 2 parts dicumyl peroxide and 1.5 parts of Z6040 aminosilane to give a hard, tough thermoset after 20 minutes of curing at 175° C.

EXAMPLE NO. 3

The procedure for Example No. 2 was repeated without the addition of PBNA in order to determine the effect of its presence. No torque increase was observed for 21.5 minutes at which time the 1,2-polybutadiene began to crosslink with a total torque rise of 20 to 200 in-lbs being recorded over two minutes. Inasmuch as the reaction time was over four times longer than the polymerization time, the PBNA addition was shown to provide an improved manner for preventing gellation but otherwise not essential to the rapid copolymerization characteristic of the present invention.

Based upon the results reported herein, it should be apparent that the novel process of the present invention can be employed to provide block copolymers of polybutadiene and nylon, as well as related copolymers, rapidly in bulk. These polymers essentially retain their useful physical properties and furthermore, undesirable cold flow and tack can be virtually eliminated. It is to be understood that the various examples reported herein have been provided to present results obtainable by practice of the disclosed invention. Inasmuch as various polymers, as well as substances for the surface treatment step, that can be employed to practice the process of the present invention have been disclosed, the invention is not to be limited by the examples provided herein. It will be understood, therefore, that other polymers and surface treatment agents or methods of treatment can be substituted for those that have been exemplified. Regarding the selection of fillers, curatives and other additives and the like, the present invention should not be restricted to less than the total group of such compounds which are known for the preparation of thermoplastic resins inasmuch as they are only optionally employed and do not constitute the point of novelty.

It is also to be understood that the amounts of particular polymers to be employed as well as various process conditions can be determined without departing from the spirit of the invention herein disclosed and described, and that the scope of the invention shall include all modifications and variations that fall within the scope of the attached claims.

We claim:

1. A process for the rapid bulk polymerization of polybutadiene/nylon-6 block copolymers comprising the steps of:

preparing a mixture comprising from about 100 to about 50 parts by weight of a polybutadiene having a weight average molecular weight of about 3000 and terminated by a compound selected from the group consisting of isocyanates and isothiocyanates and end-capped with caprolactam to provide a stable imide type terminated polymer, with more than 0 to about 50 parts by weight of a branched high vinyl, 1,2-polybutadiene having a weight average molecular weight greater than 100,000 and neutralized with caprolactam;

charging said polymer mixture, without hydrolyzing said end-capped polybutadiene, to a reaction vessel with caprolactam; and polymerizing said caprolactam at a temperature of at least about 120° C. said temperature being sufficient to flash off any solvents introduced during said step of preparing and for a time of up to about 30 minutes whereby polymerization proceeds in the absence of solvents to form a block copolymer with said end-capped polybutadiene.

2. A process, as set forth in claim 1, wherein said step of preparing a mixture comprises the steps of:

anionically polymerizing 1,2-butadiene to form an active polybutadiene segment;

terminating said polybutadiene segment with a compound selected from the group consisting of isocyanates and isothiocyanates; and end-capping said polybutadiene with caprolactam.

3. A process, as set forth in claim 1, including the further steps of:
forming pellets of said block copolymer; and
subjecting said pellets to a surface treatment whereby a coating of said pellets is provided to remove tack.

4. A process, as set forth in claim 3, wherein said step of subjecting said pellets includes immersing said pellets in an aqueous solution containing at least one member of the group consisting of $Br_2$, $Cl_2$, NaOCl, KOCl, Ca(OCl)$_2$, KMnO$_4$, K$_2$Cr$_2$O$_7$, H$_2$O$_2$ and OsO$_4$.

5. A process, as set forth in claim 4, wherein said aqueous solution contains HCl and at least one member of the group consisting of NaOCl, KOCl, Ca(OCl)$_2$, KMnO$_4$ and K$_2$Cr$_2$O$_7$.

6. A process, as set forth in claim 3, wherein said step of subjecting said pellets comprises oxidation with an aqueous solution.

7. A process, as set forth in claim 3, wherein said step of subjecting said pellets comprises halogenation with an aqueous solution.

8. A process, as set forth in claim 3, wherein said step of subjecting said pellets comprises hydroxylation with an aqueous solution.

9. A process, as set forth in claim 3, wherein said step of subjecting said pellets includes coating said pellets with a finely powdered filler material.

10. A process for the rapid bulk polymerization of block copolymers comprising the steps of:
preparing a mixture comprising from about 100 to 50 parts by weight of a stable, cold flowing rubber prepared by the anionic polymerization of monomers selected from the group consisting of olefin, conjugated diene, vinyl substituted aromatic, vinyl substituted pyridine, vinyl substituted quinoline,

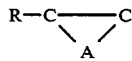

where A is O or S and R is H or an aliphatic, cycloaliphatic or aromatic group containing from 1 to 15 carbon atoms, inclusive,

where A is O or S and R is an aliphatic, cycloaliphatic or aromatic group containing from 1 to 15 carbon atoms, inclusive,

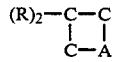

where A is O or S and R is an aliphatic, cycloaliphatic or aromatic group containing from 1 to 15 carbon atoms, inclusive, and

where R is an aliphatic, cycloaliphatic or aromatic group containing from 1 to 15 carbon atoms, inclusive;
and wherein said cold flowing rubber is end-capped by a compound selected from the group consisting of isocyanates and isothiocyanates and terminated with an amide containing compound providing a stable imide type terminated rubber, and
more than 0 to 50 parts by weight of a dry non-cold flowing rubber selected from the group consisting of ethylene-propylene-hexadiene terpolymers, natural rubber, unvulcanized styrene-butadiene rubber, butyl rubber, branched high vinyl butadiene rubber having a weight average molecular weight greater than 100,000, polynorbornene, polypentamer and thermoplastic elastomers comprising block copolymers of styrene and conjugated dienes, and neutralized with an amide containing compound;
charging said polymer mixture without hydrolyzing said end-capped cold flowing rubber to a reaction vessel with a monomer having an active hydrogen other than a monomer utilized to form a polymer present in said polymer mixture; and
polymerizing said monomer at a temperature of at least about 120° C. said temperature being sufficient to flash off any solvents introduced during said step of preparing and for a time of up to about 30 minutes whereby polymerization proceeds in the absence of solvents to form a block copolymer with said end-capped polymer.

11. A process, as set forth in claim 10, wherein said cold flowing rubber comprises low molecular weight polybutadiene having a weight average molecular weight of about 3000.

12. A process, as set forth in claim 10, wherein said non-cold flowing rubber is a branched high vinyl, high molecular weight, 1,2-polybutadiene.

13. A process, as set forth in claim 10, wherein said monomer having an active hydrogen is selected from the group consisting of lactams, ureas, urethanes and imides.

14. A process, as set forth in claim 13, wherein said monomer is caprolactam.

15. A process, as set forth in claim 10, including the further steps of:
forming pellets of said block copolymer; and
subjecting said pellets to a surface treatment whereby a coating of said pellets is provided to remove tack.

16. A process, as set forth in claim 15, wherein said step of subjecting said pellets includes immersing said pellets in an aqueous solution containing at least one member of the group consisting of $Br_2$, $Cl_2$, NaOCl, KOCl, Ca(OCl)$_2$, KMnO$_4$, K$_2$Cr$_2$O$_7$, H$_2$O$_2$ and OsO$_4$.

17. A process, as set forth in claim 16, wherein said aqueous solution contains HCl and at least one member of the group consisting of NaOCl, KOCl, Ca(OCl)$_2$, KMnO$_4$ and K$_2$Cr$_2$O$_7$.

18. A process, as set forth in claim 15, wherein said step of subjecting said pellets comprises oxidation with an aqueous solution.

19. A process, as set forth in claim 15, wherein said step of subjecting said pellets comprises halogenation with an aqueous solution.

20. A process, as set forth in claim 15, wherein said step of subjecting said pellets comprises hydroxylation with an aqueous solution.

21. A process, as set forth in claim 15, wherein said step of subjecting said pellets includes coating said pellets with a finely powdered filler material.

* * * * *